United States Patent
Matsuo et al.

(10) Patent No.: US 8,127,931 B2
(45) Date of Patent: Mar. 6, 2012

(54) APPARATUS FOR REMOVING UNBURNED CARBON IN FLY ASH

(75) Inventors: Kazuyoshi Matsuo, Ichihara (JP); Kazuo Abe, Tokyo (JP); Hitoshi Koyama, Tokyo (JP); Toshio Yamaki, Ichihara (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 281 days.

(21) Appl. No.: 12/448,565

(22) PCT Filed: Dec. 26, 2006

(86) PCT No.: PCT/JP2006/325893
§ 371 (c)(1),
(2), (4) Date: Jun. 25, 2009

(87) PCT Pub. No.: WO2008/078389
PCT Pub. Date: Jul. 3, 2008

(65) Prior Publication Data
US 2010/0051516 A1  Mar. 4, 2010

(51) Int. Cl.
*B03D 1/14* (2006.01)
(52) U.S. Cl. .................................. 209/168; 209/170
(58) Field of Classification Search .................. 209/168, 209/169, 170
See application file for complete search history.

(56) References Cited

U.S. PATENT DOCUMENTS

| | | | | |
|---|---|---|---|---|
| 3,735,931 A | * | 5/1973 | Weston | 241/20 |
| 3,770,213 A | * | 11/1973 | Lynn et al. | 241/20 |
| 4,121,945 A | * | 10/1978 | Hurst et al. | 106/405 |
| 4,483,624 A | * | 11/1984 | Bacon et al. | 366/293 |
| 5,456,363 A | * | 10/1995 | Groppo et al. | 209/166 |
| 5,936,216 A | * | 8/1999 | Wu | 209/164 |
| 2007/0199486 A1 | | 8/2007 | Saito et al. | 110/344 |

FOREIGN PATENT DOCUMENTS

| | | |
|---|---|---|
| CA | 2073709 A1 * | 1/1994 |
| JP | 61-025651 A | 2/1986 |
| JP | 63-104668 A | 5/1988 |
| JP | 05-038468 A | 2/1993 |
| JP | 10-017313 A | 1/1998 |
| JP | 11-208477 A | 8/1999 |
| JP | 3613347 B | 1/2005 |

* cited by examiner

*Primary Examiner* — Thomas M Lithgow
(74) *Attorney, Agent, or Firm* — Kubovcik & Kubovcik (57) ABSTRACT

Unburned carbon is efficiently separated according to the properties of fly ash. An apparatus is provided which comprises: a slurry preparation tank (10) in which water (c) is added to fly ash (a) to produce a slurry (d); a scavenger addition device (20) for adding a scavenger (e) to the slurry (d); a vertical surface-modification device (30) in which the slurry after addition of the scavenger is stirred at a high speed to impart shear force thereto and thereby cause the scavenger (e) to adhere to the surface of unburned carbon (b) contained in the slurry; a regulating tank (60) in which a blowing agent (f) is added to the slurry (d') which has undergone surface modification with the surface modification device; and a flotation machine (70) with which the unburned carbon (b) is floated together with bubbles (n) and separated from the slurry containing the blowing agent.

3 Claims, 6 Drawing Sheets

APPARATUS FOR REMOVING UNBURNED CARBON IN FLY ASH

FIELD OF THE INVENTION

This invention pertains to an apparatus for removing unburned carbon from fly ash and in further detail to an apparatus for removing unburned carbon from fly ash that effectively removes the unburned carbon from fly ash generated in a coal fired power plant or a fluid bed combustion furnace.

DESCRIPTION OF THE RELATED ART

Fly ash (FA) generated in coal fired power plants and fluidized bed combustion furnaces is used as a raw material for cement and as artificial, lightweight aggregate or as a cement admixture.

However, when using fly ash as a cement admixture, as any unburned carbon included in the fly ash absorbs AE agents and water reducing agents, it is necessary beforehand to supply excess AE agents and water reducing agents in excess to allow for the absorbed amount and thus is uneconomical. Furthermore, because unburned carbon is water repellent, a negative effect is produced because it separates from the concrete when it is cast and rises to the surface creating black areas due to the unburned carbon in the concrete-jointed portion. Further, for those cases where there is a large amount of unburned carbon in the fly ash, there is also the problem that the binding power of the fly ash is insufficient and hence the quality of the artificial lightweight rib decreases.

As a result, a flotation method for separating the unburned carbon has been proposed, in which water is added to the fly ash for slurrying, kerosene is added as a collector to the slurry, the surface of the unburned carbon is modified by a high speed shearing mixer, the collector is attached on the surface of the unburned carbon, and a flother is then added (for example, refer to Patent Document 1).

Figure 7:
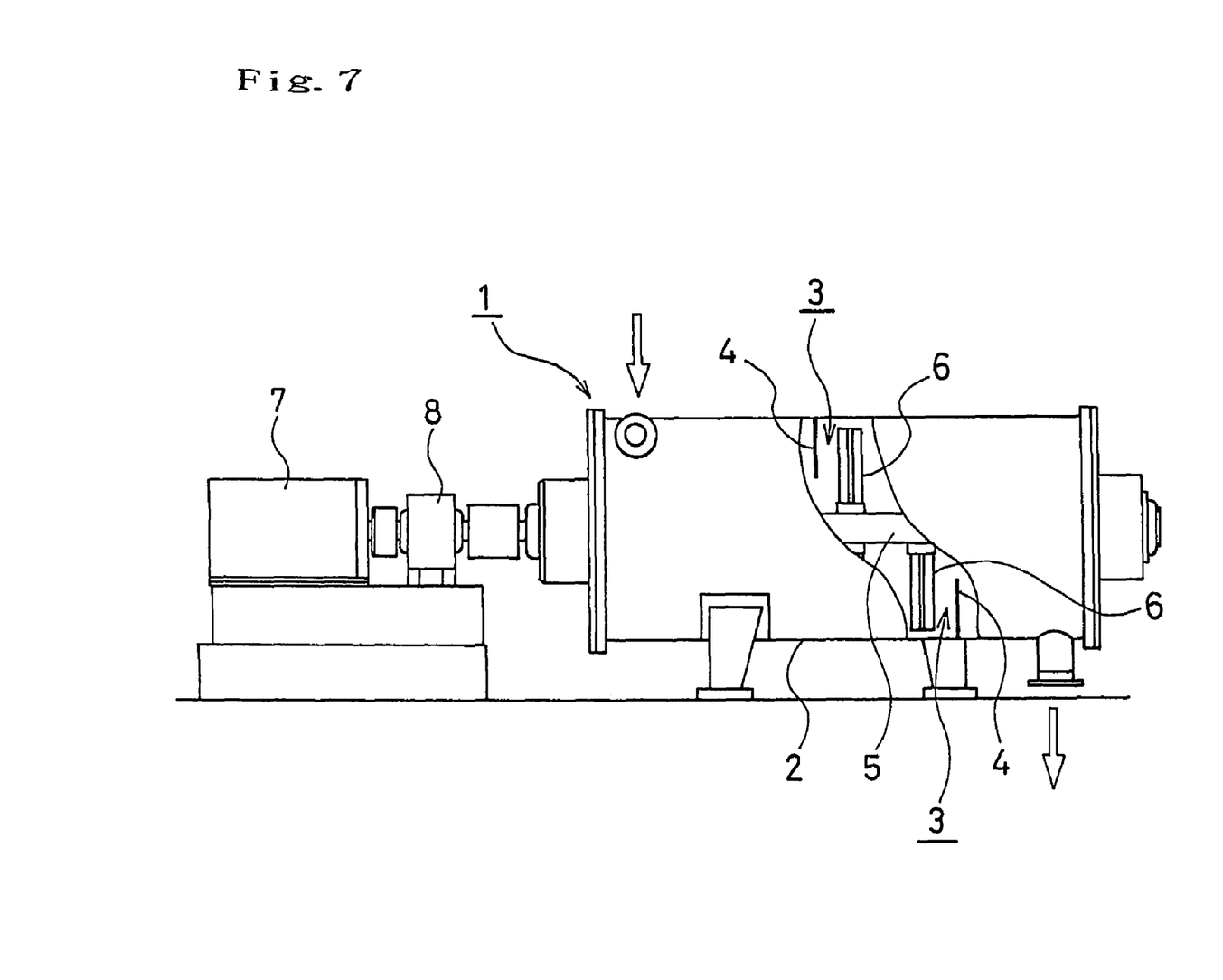
FIG. 7 is a side view diagram that includes a partial cross-section of a conventional high speed shearing mixer.

As shown in FIG. 7, the high speed shearing mixer (1) is composed of the horizontal vessel (2), a number of toroidal partition walls (4) which divide the inside of the vessel (2) into various chambers (3), the axially directed rotating shaft (5) which passes through the vessel (2) and the various stirring blades (6) which are fixed to the rotating shaft (5) and rotate inside the various chambers (3). However, because of the shearing force applied on the slurry from the stirring blades (6) after the addition of the capturing agent, it is necessary to maintain a highly precise clearance between the partition walls (4) and the stirring blades (6) or between the vessel (2) and the stirring blades (6). Furthermore, because of the length of the shaft, high technology has been required for the manufacture and maintenance of the high speed shearing mixer. In the diagram, (7) is the motor and (8) is the reduction gear.

Additionally, because in a conventional high speed shearing mixer the rotary shaft (5) is horizontal in the vessel (2), an axial seal in the gap between the vessel (2) and the rotary shaft (5) has been indispensable. Furthermore, when the vessel (2) has been scaled up from a horizontal type in a conventional high speed mixer, the distance between the slurry inlet and slurry outlet has been lengthened and it has been difficult to freely change the fly ash generating conditions and the processing time for surface modification or the processing conditions depending on, for example, the combustion temperature or combustion method or type or composition of the coal.

Patent Document 1: Japanese Patent No. 3613347

DISCLOSURE OF THE INVENTION

Problem to be Solved by the Invention

This invention has been developed in order to resolve the above-mentioned problems. Its objective is to provide an apparatus for removing unburned carbon from fly ash that, even though its construction is simple compared to a conventional high speed shearing mixer, can effectively separate the unburned carbon by conforming to the nature of the fly ash wherein through surface modification a flotation method is applied and the unburned carbon in the fly ash is removed.

Means for Solving the Problem

In order to resolve the above-mentioned problems, this invention has the structure given below.

The device for removing unburned carbon from fly ash pertaining to Claim 1 is constructed of a slurry adjusting reservoir in which a slurry is generated with the addition of water to the fly ash, an added collector device for the addition of a collector in the above-mentioned slurry, a vertical surface modification device that causes the collector to be attached on the surface of the unburned carbon in the slurry by means of the application of a shearing force through high speed stirring of the slurry after the addition of the collector, an adjusting reservoir in which a flother is added to the slurry whose surface has been modified by means of the above-mentioned surface modification device and a flotation unit in which the unburned carbon is floated and separated along with the air bubbles from the slurry after the addition of the flother.

The device for removing unburned carbon from fly ash of Claim 1 pertaining to Claim 2 is characterized by having a structure that connects multiple surface modifying devices in series composed of vertical type stirring units comprised of the above-mentioned surface modification device and stirring blades along with a vertical type stirring tank.

The device for removing unburned carbon from fly ash of Claim 1 pertaining to Claim 3 is characterized by having a structure composed of multistage toroidal partitions with the above-mentioned surface modification device set up on the inner surface of the said stirring tank, a rotating shaft set up axially in the above-mentioned stirring tank and a vertical multistage stirring tank composed of stirring blades set up alternately with the said partitions on the said rotating shaft.

The device for removing unburned carbon from fly ash described in any one of Claim 1 to 3 pertaining to Claim 4 is characterized by applying a shearing force on the slurry after the addition of the collector and applies a 10 to 100 kWh/m$^3$ agitation force per unit slurry amount.

The device for removing unburned carbon from fly ash of Claim 2 or 3 pertaining to Claim 5 is characterized by having a clearance of 2 to 100 mm between the stirring tank and the stirring blades.

The device for removing unburned carbon from fly ash of Claim 2 pertaining to Claim 6 is characterized by having a bypass channel that in addition to connecting the adjacent vertical stirring tank through a connecting tube goes around the stirring tank which is fixed to the said connecting tube.

Effects of the Invention

From the above, because the invention pertaining to Claim 1 is constructed of a slurry adjusting tank in which a slurry is generated with the addition of water, a collector addition device in which a collector is added to the slurry, a vertical surface modification device on which the collector is attached on the surface of the unburned carbon in the slurry through high speed stirring of the slurry after the collector is added and the application of a shearing force, an adjusting tank in which a flother has been added to the slurry which has been surface modified by the surface modification device and a floatation unit in which the unburned carbon along with air bubbles is floated and separated, an axial seal for the surface modification device that does high speed stirring of the slurry and applies a shearing force after the addition of the collector not only is unnecessary, but also possible to reduce the setup area of the surface modification device when compared to a conventional horizontal type high speed shearing mixer. As a result, it is possible to improve serviceability and operability at maintenance time.

Because the invention pertaining to Claim 2 has a structure in which the above-mentioned surface modification device and a vertical stirring unit having stirring blades are connected in series with a vertical stirring tank and a multistage shearing force is applied, despite being a simple device compared to a conventional horizontal type high speed shearing mixer, it is possible to modify the surface of the unburned carbon through conforming to the nature of the various types of fly ash in pulverized coal combustion boilers or fluidized bed combustion furnaces, that is, it is possible to effectively attach the collector on the surface of the unburned carbon.

Furthermore, because the rotating shaft is horizontal to the vessel in a conventional horizontal high speed shearing mixer, a shaft seal in the space between the vessel itself and the rotating shaft has been indispensable but with the surface modification device of this invention the stirring tank is vertical so that a shaft seal for the stirring unit is unnecessary. As a result, it is possible to improve both serviceability and operability at maintenance time. Furthermore, by varying the number of stirring tanks used, it is possible to arbitrarily change the generating conditions of the fly ash, that is, the processing time or processing conditions depending on the combustion temperature or combustion method or the type or structure of the coal. Additionally, by increasing the number and size of the stirring tanks, with this invention it is possible to easily scale up the surface modification device.

Because the invention pertaining to Claim 3 has multistage toroidal partitions with the above-mentioned surface modification device set up on the inner surface of the said stirring tank, a rotating shaft set up axially in the above-mentioned stirring tank and a vertical multistage stirring tank composed of stirring blades set up alternately with the said partitions on the said rotating shaft, the seal of the rotating shaft that does high speed stirring of the slurry and applies a shearing force after the addition of the collector not only is just one-sided, compared to a conventional horizontal high speed shearing mixer it is possible to reduce the setup area of the surface modification device.

DETAILED DESCRIPTION OF THE INVENTION

An explanation is given below for using the diagrams for configurational realization of this invention.

Figure 1:
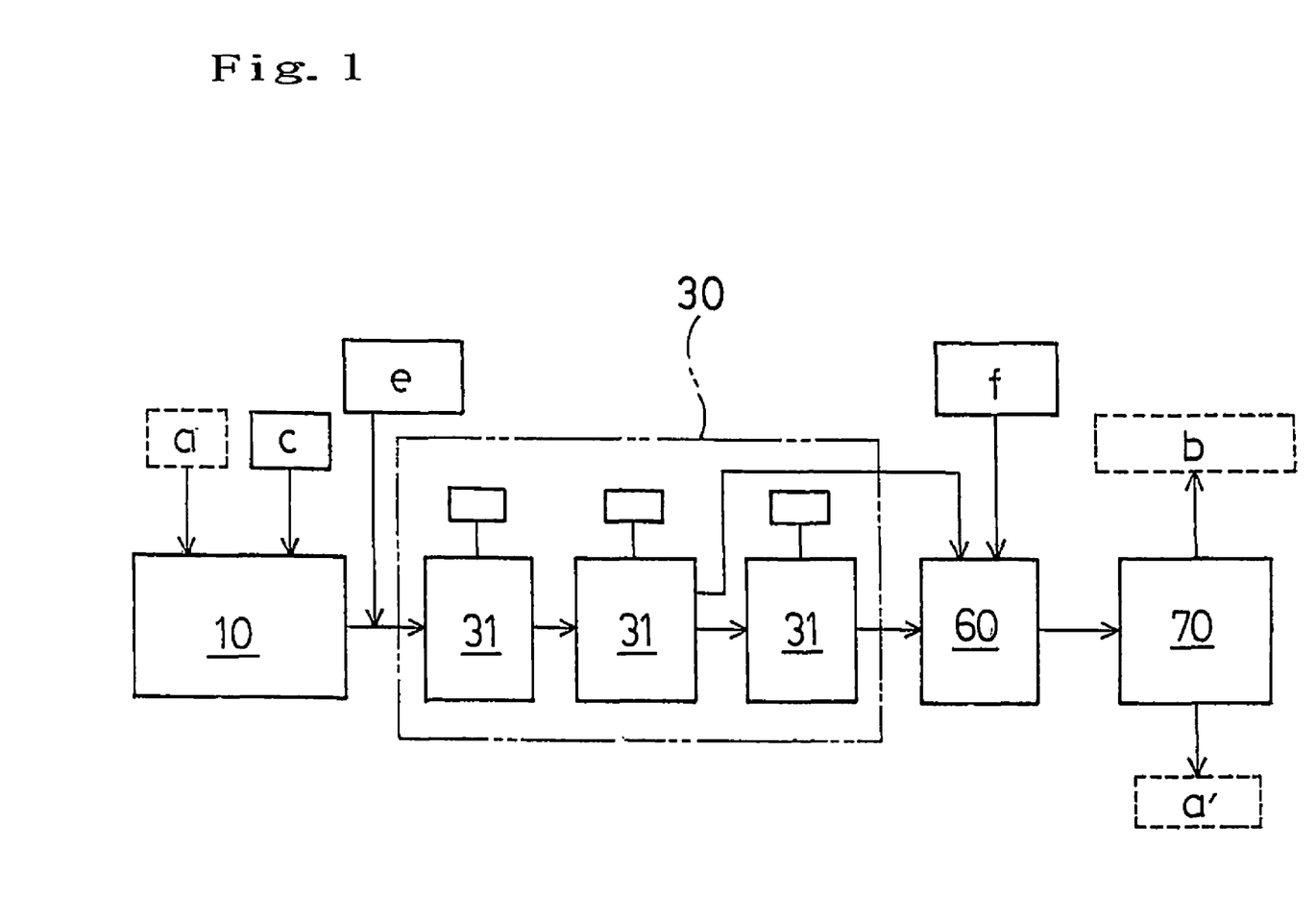
FIG. 1 is a block diagram of the device for removing unburned carbon from fly ash pertaining to this invention.

As shown in FIG. 1, the device for removing unburned carbon from fly ash pertaining to this invention is principally constructed of a slurry adjusting tank (10), a surface modification unit (30), an adjusting tank (60) and a flotation unit (70) for removing unburned carbon (b) from fly ash. In the diagram, (c) is water, (e) is the collector, (f) is the flother and (a') is the ash content.

Figure 2:
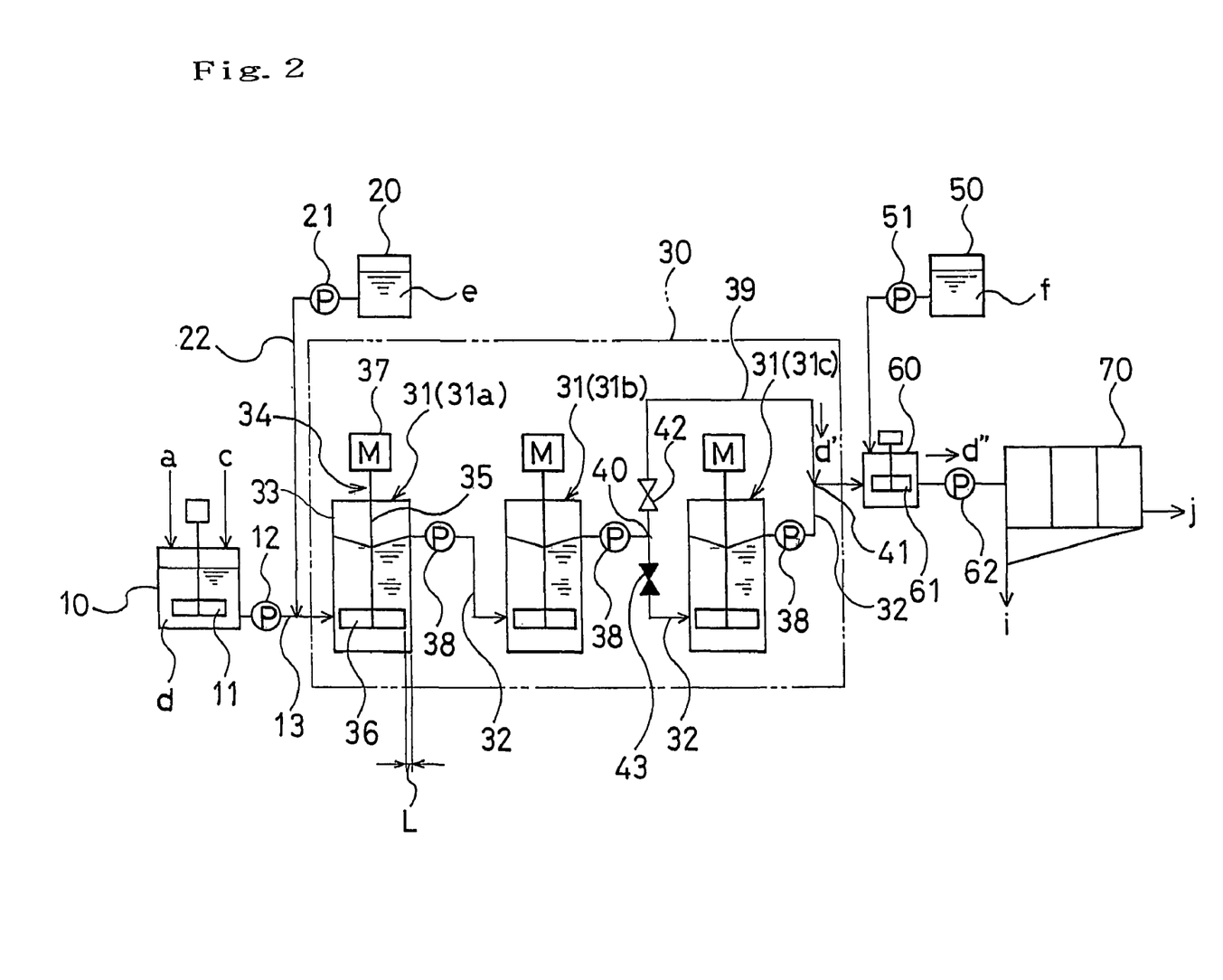
FIG. 2 is a general schematic diagram of the device for removing unburned carbon from fly ash pertaining to this invention.

As shown in FIG. 2, the slurry adjusting tank (10) is set up so that the water (c) is mixed with the fly ash and the slurry (d) is generated. The stirring blade (11) is provided to stir the slurry (d). The concentration of the fly ash is adjusted to be in the range of 5 to 40 wt % or 10 to 25 wt %.

The slurry adjusting tank (10) has a water providing device set up with the fly ash tank that is not shown in the previous stage and it has a pump (12) that supplies the slurry (d) to the surface modification device (30). Subsequent to the pump (12) a collector tank (20) that accommodates the collector (e), i.e., kerosene, light oil or heavy oil, a pump (21) which adds the collector (e) inside the collector tank (20) to the slurry (d) and a collector coupling tube (22) are provided. This collector coupling tube (22) is connected to the slurry supply tube (13) which connects the surface modification device (30) to the slurry adjusting tank (10). The collector (e) is added to the slurry (d) inside the slurry providing tube (13). The added amount of the collector should be in the range of 0.01 to 3.0 wt % (fly ash ratio) or 0.05 to 1.0 wt % (fly ash ratio).

The surface modification device (30) is set up so a shearing force is applied on the slurry with the collector and the surface of the unburned carbon is modified and is so constructed that the various surface modification units (31) are connected in series through the connecting tube (32). The surface modification unit (31) is variously constructed of a vertical stirring tank (33) and a vertical stirring unit (34) set up inside this stirring tank (33). The stirring unit (34) is constructed of a rotating shaft (35), a stirring blade (36) set up at the tip of the unit and a motor (37) which causes the stirring blade (36) to rotate at high speed.

Figure 3:
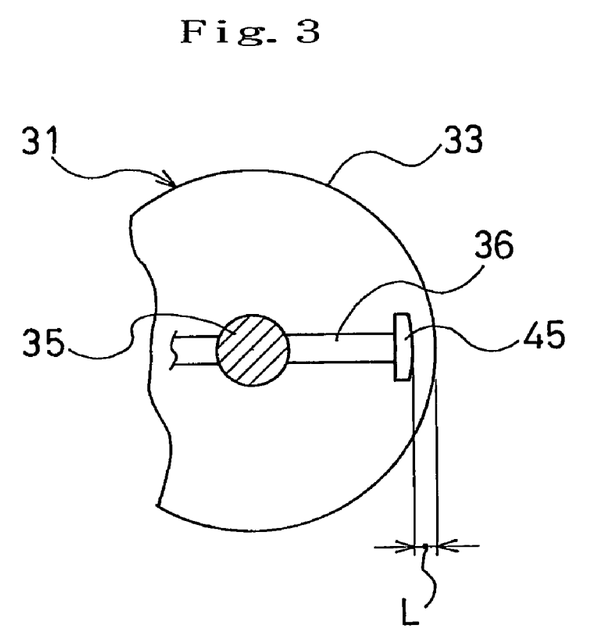
FIG. 3 is an expanded plane diagram of the components of the surface modification unit.
Figure 4:
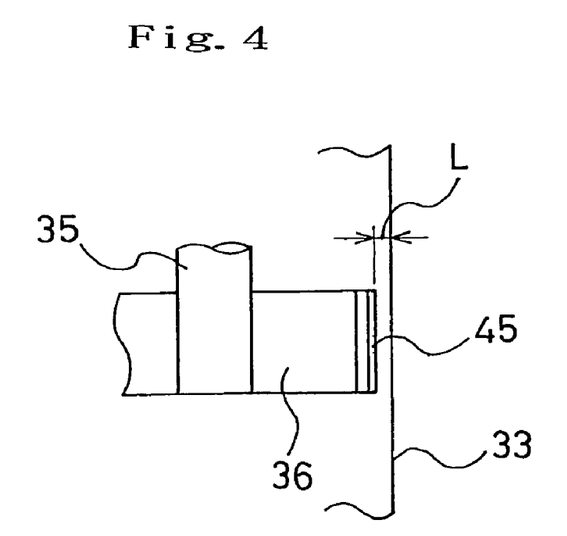
FIG. 4 is an expanded side view diagram of the components of the surface modification unit.

For the configuration of the stirring blade, it is preferable to have its configuration be strip-like from a side view. Furthermore, as shown in FIG. 3, it is permissible to have the abrasion body (45) set up at the tip of the stirring blade (36) and to abrade the surface of the unburned carbon between the abrasion body (45) and the inner wall surface of the stirring tank (33). As shown in FIG. 3, the shape of the abrasive body (45) from a plane view may be convex but it may also be trapezoidal or triangular. Furthermore, it is preferable to have a configuration whereby the surface of the unburned carbon can be abraded between the abrasion body (45) and the inner wall surface of the stirring tank (33).

Additionally, it is preferable if the space (clearance) (L) between the tip of the stirring blade (36) and the inner wall surface of the stirring tank (33) be in the range of 2 to 100 mm or 5 to 50 mm. When the clearance between the inner wall surface of the stirring blade (33) and the tip of the stirring blade (36) is less than 2 mm, a high degree of precision in the manufacturing of the surface modification unit is demanded which makes the manufacturing costs high. Furthermore, when the clearance between the inner wall surface of the stirring tank (33) and the tip of the stirring blade (36) exceeds 100 mm, the effectiveness of the surface modification of the unburned carbon is reduced.

Furthermore, the stirring blade (36) should apply an agitation force (agitation power) of 10 to 100 kWh/m³ per unit slurry or preferably an agitation force of 30 to 50 kWh/m³. When the agitation power of the stirring blade (36) per unit slurry is less than 10 kWh/m³, it is difficult to have surface modification of the unburned carbon. On the other hand, when the agitation power of the stirring blade (36) per unit slurry exceeds 100 kWh/m³, it is possible to modify the surface of the unburned carbon but the amount of electricity consumed increases rapidly. Furthermore, because of the increased abrasion inside the stirring tank, it is uneconomical.

Additionally, the slurry retention time is set up to be 0.1 to 10 minutes or preferably 0.5 to 5 minutes. When the slurry retention time is less than 0.1 minutes, it is difficult to carry out surface modification of the unburned carbon. On the other hand, when the slurry retention time exceeds 10 minutes, surface modification of the unburned carbon does not progress any farther so that setup costs and running costs increase making it uneconomical.

The surface modification device (30) is constructed of a number (three in the diagram) of surface modification units (31) which are connected in series by the connecting tube (32) which has pumps (38). Furthermore, the surface modification device (30) has a bypass channel (39) that goes around the final (No. 3) surface modification unit (31) and the slurry modified in previous stages, that is, in the No. 1 and No. 2 surface modification units (31a) and (32b), is able to bypass the No. 3 surface modification unit (31c). The inlet (40) to the bypass channel (39) is connected to the No. 2 connecting tube (32) and the outlet (41) of the bypass channel (39) is connected to the No. 3 connecting tube (32). The bypass channel has a bulb (42) and the No. 2 connecting tube (32) has a bulb (43) on the trailing side from the connection point of the bypass channel (39).

The adjusting tank (60) has the flother (f) added by means of the pump (51) from the flother tank (50) supplied to the slurry provided from the surface modification unit (30) and the mixture is blended at low speed. A stirring blade (61) is located inside.

MIBC (methyl isobutyl carbinol) is used as the preferable foaming agent. The amount of the flother should be 20 to 5,000 ppm or preferably 100 to 1,000 ppm. When the added amount of the flother is less than 20 ppm, there is insufficient foaming action. On the other hand, when the amount of the flother exceeds 5,000 ppm, the flother costs increase. Furthermore, the recovery rate of the fly ash is reduced and additionally the surrounding area is contaminated from the excess air bubbles.

At the end section of the adjusting tank (60) a pump (62) is positioned to provide the slurry (d) to the floatation unit (70) after the addition of the flother. The floatation unit (70) causes the unburned carbon after modification to adhere to the air bubbles and they rise to the surface and the unburned carbon (froth) and the fly ash (tail) with the unburned carbon removed are separated. A well-known conventional floatation unit is used.

Figure 6:
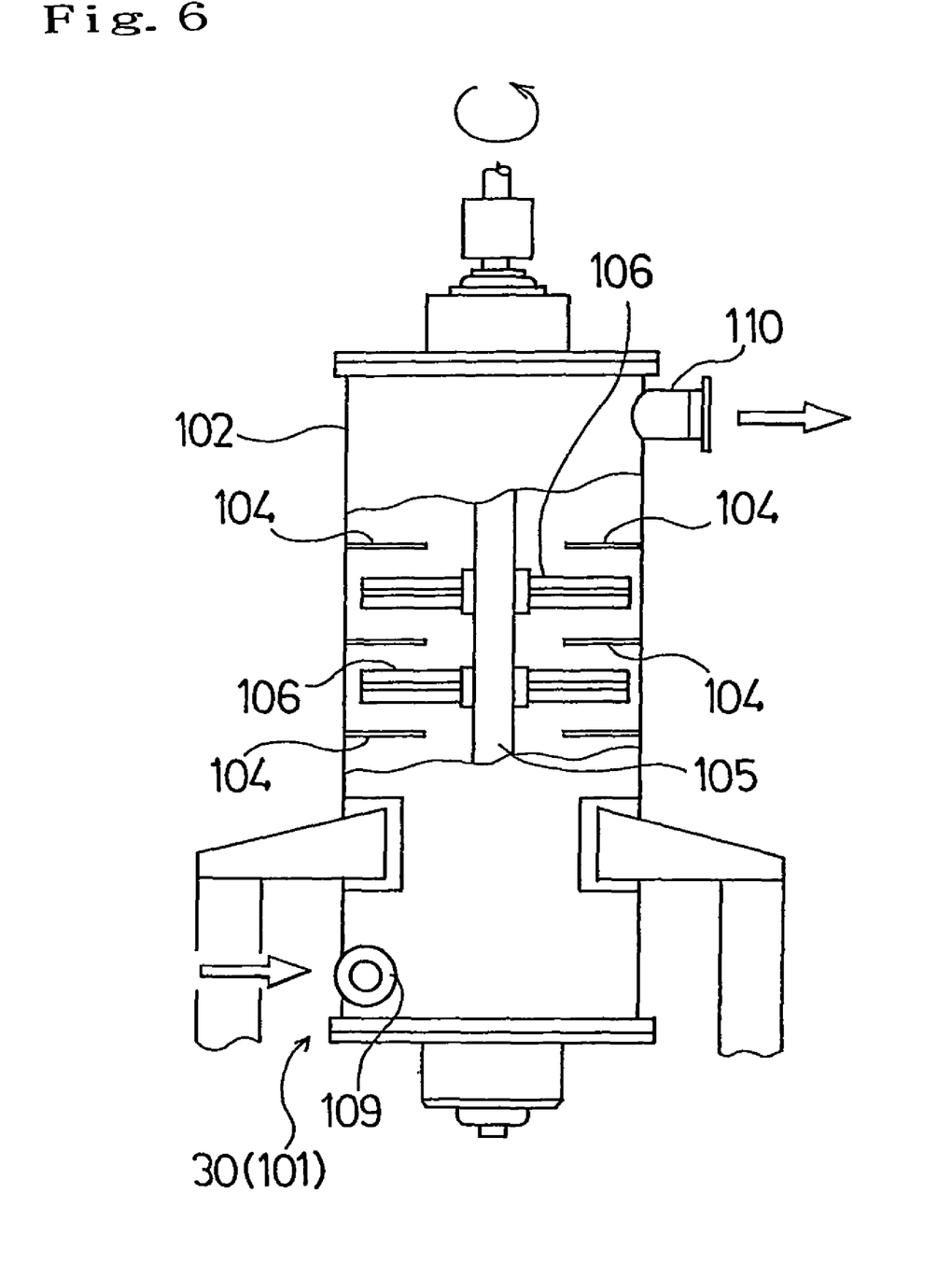
FIG. 6 is a side view diagram that includes a partial cross-section of the vertical type multistage stirring unit pertaining to this invention.

As shown in FIG. 6, it is possible to use a vertical multistage stirring tank (101) as the above-mentioned surface modification device (30). This vertical multistage stirring tank (101) is constructed of a vertical stirring tank (102), toroidal partitions (104) set up at numerous points on the inner surface of the stirring tank (102), a rotating shaft (105) set up on the shaft center of the stirring tank (102) and stirring blades (106) set up alternately with the above-mentioned partitions (104) on the rotating shaft (105). Furthermore, in the diagram (109) is the slurry inlet and (110) is the slurry discharge outlet. Additionally, the clearance between the stirring tank (102) and the stirring blades (106), the agitation force (agitation power) of the stirring blades (106) and the slurry retention time are the same as in the previous examples.

Next, an explanation is given concerning the operation of the device for removal of the unburned carbon.

For this invention, the number of the surface modification units is to be determined in advance depending on the nature of the fly ash. For example, for relatively easy to surface modify fly ash (e.g. fly ash from bituminous coal), the number of surface modification units is a small number (two in the diagram). For difficult surface modification fly ash (e.g. fly ash from general coal), a larger number of surface modification units is used (three in the diagram. Furthermore, for convenience of explanation, an explanation is given when the number of surface modification units used is two. In this case, the bulb (42) of the bypass channel (39) is open and the bulb (43) of the No. 2 connecting tube (32) is closed.

In FIG. 2 the fly ash (a) is supplied to the slurry adjusting tank (10) and, is mixed with water (c) producing the slurry (d). At this time, the concentration of the slurried fly ash is adjusted, for example, to 5 to 40 wt %. The slurry (d) is supplied to the No. 1 surface modification unit (31 a) by the pump (12) and while on its way the collector (e) in a prescribed amount (e.g. 0.01 to 3.0 wt. % (fly ash ratio)) is added from the collector tank (20).

The slurry (d) and the collector (e) provided to the No. 1 surface modification unit (31a) has a shearing force applied to it from the stirring blade (36) rotating at high speed (e.g. 200 to 10,000 rpm). The slurry (d) and the collector (e) to which a shearing force is applied in the No. 1 surface modification unit (31a) are supplied to the No. 2 surface modification unit (31b) and again a shearing force is applied. In this manner, the shearing force applied to the slurry and the collector modifies the surface of the unburned carbon and the flotation buoyancy is improved. On this point an explanation is given while referencing FIGS. 5(a) to 5(c).

Figure 5:
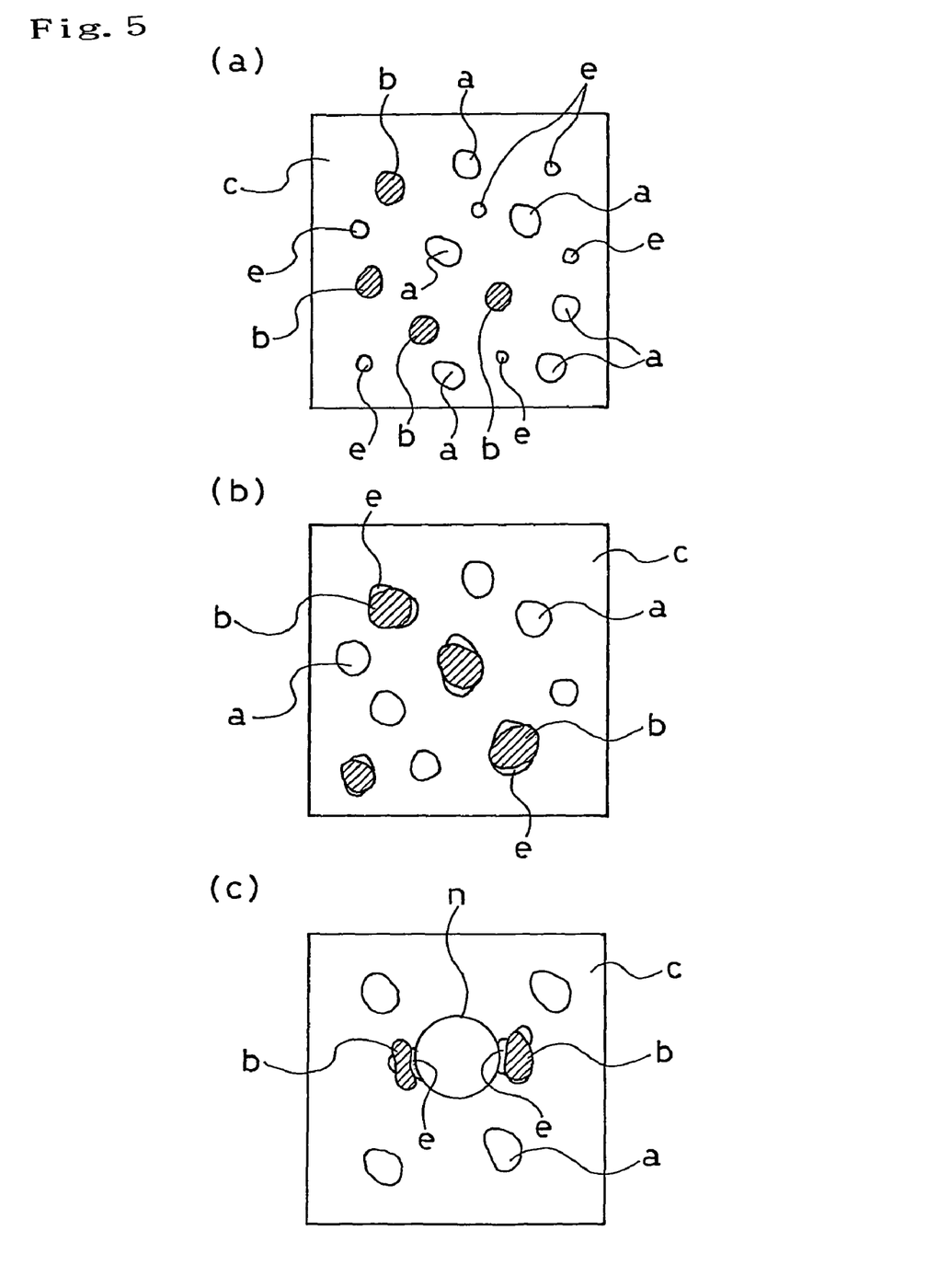
FIG. 5(a) is a state diagram when the collector is added.
FIG. 5(b) is a state diagram showing surface modification.
FIG. 5(c) is a state diagram when the flotation device is used.

As shown in FIG. 5(a), the fly ash (a) in the water (c), the unburned carbon (b) and the collector (e) are only in a mixed state. Because the amount of unburned carbon adhering to the air bubbles together with the collector in this state even when supplied to the slurry flotation unit is extremely minimal, it is not possible to effectively remove the unburned carbon in the fly ash from flotation.

However, when doing surface modification by applying a shearing force on the slurry and collector of FIG. 5(a), energy of activation is transitionally produced on the surface of the various dispersed particles of the unburned carbon (b), the fly ash (a) and the collector (e) in the slurry and the surfaces become very oleophilic. The various particle surfaces of the oleophilic unburned carbon (b) and the collector (e) cohere and their mutual surface energies drop with the result that, as shown in FIG. 5(b), the collector (e) adheres to the unburned carbon (b).

Accordingly, when using a flotation device for flotation, as shown in FIG. 5(c) it is possible to improve the flotation buoyancy of the unburned carbon (b) after the unburned carbon (b) adhering to the collector (e) adheres to the air bubble (n) and floats to the surface.

The modified slurry (d') which is expelled from the No. 2 surface modification unit (31b) is supplied to the adjusting tank (60) through the bypass channel (39). In this adjusting tank (60) a flother (f) such as MIBC (methyl isobutyl carbinol) is added in a prescribed amount (e.g. 20 to 5,000 ppm). The slurry (d") with the added flother (f) is supplied to the flotation unit (70) where it is floated.

The froth (i) that includes the unburned carbon is separated into solid and liquid materials by a filter press not shown in the diagram and the unburned carbon (c) is recovered. The liquid portion dehydrated by the filter press is supplied to the slurry adjusting tank (10) through a pump (not shown in the diagram) and is again added to the fly ashy. On the other hand, the tailings (fly ash) from the flotation device (70) are separated into solid and liquid materials by the solid/liquid separator (centrifugal dehydrator) which is not shown in the diagram and used in a cement mixture as a product with ash content.

INDUSTRIAL APPLICABILITY

This invention can be applied in a desirable manner when removing unburned carbon effectively from fly ash generated in coal burning thermal electric power plants and fluidized bed combustion furnaces.

What is claimed is:

1. An apparatus for removing unburned carbon from fly ash, comprising
    a slurry adjusting tank in which a slurry is generated with the addition of water to fly ash,
    a collector addition device in which a collector is added to the above-mentioned slurry,
    a vertical high speed stirring tank in which the slurry with added collector is stirred at high speed and through the application of a shearing force and the collector is attached to the surface of the unburned carbon in the slurry,
    an adjusting tank in which a frother is added to the slurry having its surface modified by the high speed stirring tank, and
    a flotation unit in which the unburned carbon is floated and separated along with the air bubbles from the slurry after the frother has been added,
    wherein a plurality of the high speed stirring tanks are connected in series by connecting tubes and have a bypass channel arranged to bypass a predetermined high speed stirring tank connected by said connecting tubes.

2. The apparatus for removing unburned carbon from fly ash according to claim 1, characterized by applying an agitation force of 10 to 100 kWh/m$^3$ per unit amount of slurry to the slurry by the high speed stirring tank after a collector has been added.

3. The apparatus for removing unburned carbon from fly ash according to claim 1, characterized by having 2 to 100 mm clearances between the stirring tank and the stirring blades in the high speed stirring tanks.

* * * * *